United States Patent
Liu et al.

(10) Patent No.: US 11,348,584 B2
(45) Date of Patent: May 31, 2022

(54) METHOD FOR VOICE RECOGNITION VIA EARPHONE AND EARPHONE

(71) Applicant: GUANGDONG OPPO MOBILE TELECOMMUNICATIONS CORP., LTD., Guangdong (CN)

(72) Inventors: Shaobin Liu, Guangdong (CN); Qiang Tang, Guangdong (CN); Jia Liu, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 75 days.

(21) Appl. No.: 16/924,931

(22) Filed: Jul. 9, 2020

(65) Prior Publication Data
US 2021/0012773 A1 Jan. 14, 2021

(30) Foreign Application Priority Data
Jul. 12, 2019 (CN) .......................... 201910629195.9

(51) Int. Cl.
*G10L 15/22* (2006.01)
*H04R 1/10* (2006.01)

(52) U.S. Cl.
CPC ............ *G10L 15/22* (2013.01); *H04R 1/1016* (2013.01); *H04R 1/1041* (2013.01); *G10L 2015/223* (2013.01)

(58) Field of Classification Search
CPC ......... G10L 15/08; G10L 15/22; G10L 15/30; G10L 2015/223; G10L 15/20;
(Continued)

(56) References Cited

U.S. PATENT DOCUMENTS 9,135,915 B1 * 9/2015 Johnson ................... H04R 1/46
9,633,669 B2 * 4/2017 Salvador ............... H04L 1/1874
(Continued)

FOREIGN PATENT DOCUMENTS

CN       106714023 A     5/2017
CN       107993656 A     5/2018
(Continued)

OTHER PUBLICATIONS

International search report,International Application No. PCT/CN2020/101364, dated Oct. 15, 2020 (9 pages).
(Continued)

*Primary Examiner* — Gerald Gauthier
(74) *Attorney, Agent, or Firm* — Young Basile Hanlon & MacFarlane, P.C.

(57) ABSTRACT

A method for voice recognition via an earphone is disclosed. The method includes receiving first audio data via the first microphone and buffering the first audio data in response to the first trigger signal; receiving second audio data via the first microphone and recognizing whether the first audio data contains data of a wake-on-voice word in response to the second trigger signal; and recognizing whether the second audio data contains data of the wake-on-voice word. The first audio data is received and buffered in a first duration starting from when the first trigger signal is received and ending when the second trigger signal is received. The second audio data is received in a second duration starting from when the second trigger signal is received and ending when whether the first audio data contains data of the wake-on-voice word is recognized.

16 Claims, 11 Drawing Sheets

(58) Field of Classification Search
CPC ......... G10L 15/28; G10L 25/78; G10L 25/84;
H02J 50/27; H04R 1/1016; H04R 1/1041;
H04R 1/1091; H04R 3/005; H04W 76/14;
G06F 3/165; G06F 3/167; G06F 16/3329;
H04N 21/4307
USPC .......... 381/92, 71.1; 386/203; 704/231, 275,
704/233
See application file for complete search history.

(56) References Cited

U.S. PATENT DOCUMENTS

| | | | |
|---|---|---|---|
| 9,910,636 B1 | 3/2018 | Chevalier | |
| 10,291,975 B2* | 5/2019 | Howell | H04R 1/1041 |
| 10,313,782 B2* | 6/2019 | Dusan | G10L 25/78 |
| 10,477,294 B1* | 11/2019 | Jorgovanovic | H04R 1/1016 |
| 10,623,843 B1* | 4/2020 | Jorgovanovic | H04R 5/033 |
| 10,916,248 B2* | 2/2021 | Gomes | G10L 15/22 |
| 11,048,293 B2* | 6/2021 | Shin | H04R 27/00 |
| 11,153,678 B1* | 10/2021 | Jorgovanovic | H04R 1/1091 |
| 11,166,112 B2* | 11/2021 | Blum | H02J 50/12 |
| 11,189,273 B2* | 11/2021 | Bundalo | G06F 1/3203 |
| 2008/0253583 A1* | 10/2008 | Goldstein | G06F 3/16 381/92 |
| 2011/0026722 A1* | 2/2011 | Jing | G10L 25/84 381/71.1 |
| 2012/0022863 A1* | 1/2012 | Cho | G10L 15/14 704/233 |
| 2014/0337036 A1* | 11/2014 | Haiut | G10L 15/20 704/275 |
| 2014/0376873 A1* | 12/2014 | Tanaka | H04N 5/44513 386/203 |
| 2015/0161998 A1* | 6/2015 | Park | G10L 25/78 704/231 |
| 2015/0255070 A1* | 9/2015 | Schuckle | G10L 15/28 704/275 |
| 2017/0185375 A1* | 6/2017 | Martel | G06F 40/279 |
| 2018/0324518 A1* | 11/2018 | Dusan | G10L 25/06 |
| 2019/0214002 A1* | 7/2019 | Park | G10L 15/08 |
| 2021/0012773 A1* | 1/2021 | Liu | H04R 1/1041 |
| 2021/0342032 A1* | 11/2021 | Guo | H04R 1/1041 |

FOREIGN PATENT DOCUMENTS

| | | |
|---|---|---|
| CN | 108962240 A | 12/2018 |
| CN | 109065047 A | 12/2018 |
| CN | 109346075 A | 2/2019 |
| EP | 2887205 A1 | 6/2015 |

OTHER PUBLICATIONS

European search report, European Application No. 20185064.1, dated Dec. 7, 2020 (7 pages).
Communication pursuant to Article 94(3) EPC for EP Application 20185064.1 dated Oct. 15, 2021. (4 pages).
Indian Examination Report for IN Application 202014029446 dated Nov. 11, 2021. (6 pages).

* cited by examiner

METHOD FOR VOICE RECOGNITION VIA EARPHONE AND EARPHONE

CROSS-REFERENCE TO RELATED APPLICATION(S)

This application claims priority to Chinese Patent Application No. 201910629195.9, filed on Jul. 12, 2019, the content of which is herein incorporated by reference in its entirety.

TECHNICAL FIELD

The present disclosure generally relates to the technical field of voice recognition, and in particular to a method for voice recognition via an earphone and an earphone.

BACKGROUND

With the advancement of artificial intelligence (AI) technology, the voice control technology is applicated in consumer electronic products more and more widely, for example mobile phones and tablet computers. There are many voice assistant products on the market, such as Apple's Siri, Google's Google Assistant, Microsoft's Microsoft Xiaobing, etc. These voice assistant products are installed in a terminal device such as a mobile phone and a tablet computer, or in a smart product such as a smart speaker and a robot, and perform corresponding operations by recognizing the user's voice commands, which greatly facilitates the user's use.

The voice assistant generally detects human body vibration and then enables recording of the MIC in use. However, there is a certain amount of time during this process, and thus, some words will be lost before the wake-up word is recognized, resulting in unreliable recognition.

SUMMARY

According to one aspect of the present disclosure, a method for voice recognition via an earphone is provided. The method includes receiving first audio data via the first microphone and buffering the first audio data in response to the first trigger signal; receiving a second trigger signal; receiving second audio data via the first microphone and recognizing whether the first audio data contains data of a wake-on-voice word in response to the second trigger signal; and recognizing whether the second audio data contains data of the wake-on-voice word. The first audio data is received and buffered in a first duration, the first duration starting from a time point at which the first trigger signal is received and ending at another time point at which the second trigger signal is received; and the second audio data is received in a second duration, the second duration starting from the another time point at which the second trigger signal is received and ending at yet another time point at which whether the first audio data contains data of the wake-on-voice word is recognized.

According to another aspect of the present disclosure, a method for voice recognition via an earphone is provided. The method includes recognizing whether a first set of audio data contains data of a wake-on-voice word. The first set of audio data includes first audio data and second audio data, the first audio data is received and buffered via the first microphone in a first duration, and the second audio data is received via the first microphone in a second duration. The first duration ends at a time point at which the recognizing is performed, and the second duration starts from time point at which the time point at which the recognizing is performed.

According to yet another aspect of the present disclosure, an earphone is provided. The earphone includes a first microphone configured for receiving a first set of audio data including first audio data and second audio data, wherein the first audio data is received in a first duration, and the second audio data is received in a second duration; a first buffer electrically connected to the first microphone and configured for buffering the first set of audio data, wherein the first audio data is buffered in the first duration; and a processor electrically connected to the first microphone and the first buffer, respectively, and configured for recognizing whether the first set of audio data contains data of a wake-on-voice word. The first duration ends at a time point at which the first set of audio data is triggered to be recognized, and the second duration starts from the time point at which the first set of audio data is triggered to be recognized.

BRIEF DESCRIPTION OF DRAWINGS

In order to explain the technical solutions in embodiments of the present disclosure more clearly, the drawings used for the description of the embodiments will be briefly described in the following will briefly introduce the drawings required in the description of the embodiments. Obviously, the drawings in the following description are only some embodiments of the present disclosure. One skilled in the art may acquire other drawings based on these drawings, without making any inventive work.

DETAILED DESCRIPTION

Figure 1:
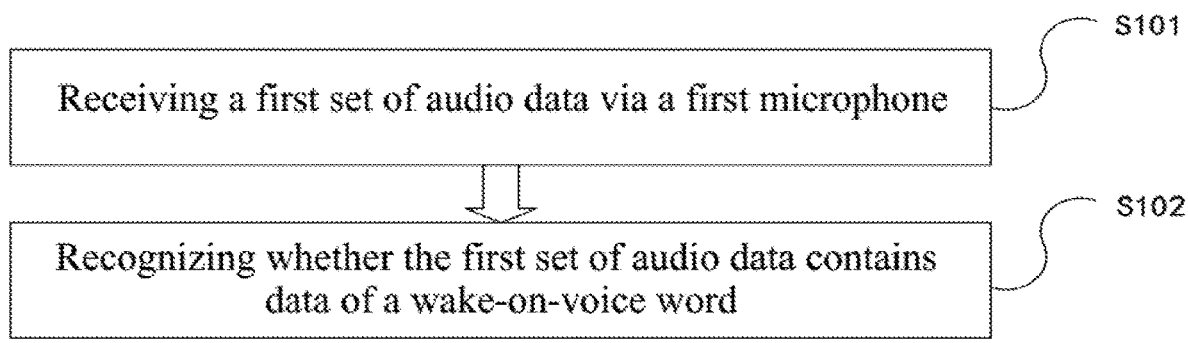
FIG. 1 is a flow chart of a method for voice recognition via an earphone according to some embodiments of the present disclosure.

The present disclosure will be further described in detail below with reference to the drawings and embodiments. In particular, the following embodiments are only used to illustrate the present disclosure, but do not limit the scope of the present disclosure. Similarly, the following embodiments are only a part of the embodiments of the present disclosure but not all the embodiments. All other embodiments obtained by a person of ordinary skill in the art without creative efforts shall fall within the protection scope of the present disclosure.

Reference to "embodiments" herein means that specific features, structures, or characteristics described in connection with the embodiments may be included in at least one embodiment of the present disclosure. The term appearing in various places in the specification does not necessarily refer to neither the same embodiment, nor an independent or alternative embodiment mutually exclusive of other embodiments. Those skilled in the art understand explicitly and implicitly that the embodiments described herein can be combined with other embodiments.

A method for voice recognition via an earphone is provided. The earphone including a first microphone. The method includes: receiving a first trigger signal; receiving first audio data via the first microphone and buffering the first audio data in response to the first trigger signal; receiving a second trigger signal; receiving second audio data via the first microphone and recognizing whether the first audio data contains data of a wake-on-voice word in response to the second trigger signal; and recognizing whether the second audio data contains data of the wake-on-voice word. The first audio data is received and buffered in a first duration, the first duration starting from a time point at which the first trigger signal is received and ending at another time point at which the second trigger signal is received; and the second audio data is received in a second duration, the second duration starting from the another time point at which the second trigger signal is received and ending at yet another time point at which whether the first audio data contains data of the wake-on-voice word is recognized.

In some embodiments, the second duration is less than a duration in which the first audio data is recognized.

In some embodiments, the first trigger signal is a signal indicating that the earphone is worn in an ear.

In some embodiments, the second trigger signal is a signal indicating that a human-mouth movement occurs.

In some embodiments, the method further includes sending a control instruction to a mobile terminal connected to the earphone in response to the wake-on-voice word being recognized from the first audio data or the second audio data, the control instruction indicating the mobile terminal to perform an operation corresponding to the wake-on-voice word.

In some embodiments, the earphone further includes a first buffer connected to the first microphone and configured for buffering the first audio data received in the first duration.

In some embodiments, the method includes receiving a second set of audio data via a second microphone and buffering the second set of audio data in a second buffer, the second set of audio data coming from ambient noise and including third audio data and fourth audio data, wherein the third audio data and the first audio data are received and buffered simultaneously in the first duration, and the fourth audio data and the second audio data are received simultaneously in the second duration; and denoising the first audio data according to the third audio data and denoising the second audio data according to the fourth audio data.

Another method for voice recognition via an earphone is provided. The earphone including a first microphone. The method includes recognizing whether a first set of audio data contains data of a wake-on-voice word, the first set of audio data including first audio data and second audio data, the first audio data being received and buffered via the first microphone in a first duration, and the second audio data being received via the first microphone in a second duration. The first duration ends at a time point at which the recognizing is performed, and the second duration starts from time point at which the time point at which the recognizing is performed.

In some embodiments, the second duration is less than a duration in which whether the first audio data is recognized.

In some embodiments, the first duration starts from a time point at which the earphone is worn in an ear.

In some embodiments, the recognizing is performed in response to a human-mouth movement occurring.

In some embodiments, the method further includes sending a control instruction to a mobile terminal connected to the earphone in response to the wake-on-voice word being recognized from the first audio data or the second audio data, the control instruction indicating the mobile terminal to perform an operation corresponding to the wake-on-voice word.

In some embodiments, the method includes receiving a second set of audio data via a second microphone and buffering the second set of audio data in a second buffer, the second set of audio data coming from ambient noise, wherein the first set of audio data and the second set of audio data are received simultaneously; and denoising the first set of audio data according to the second set of audio data.

An earphone is further provided. The earphone includes: a first microphone configured for receiving a first set of audio data including first audio data and second audio data, wherein the first audio data is received in a first duration, and the second audio data is received in a second duration; a first buffer electrically connected to the first microphone and configured for buffering the first set of audio data, wherein the first audio data is buffered in the first duration; and a processor electrically connected to the first microphone and the first buffer, respectively, and configured for recognizing whether the first set of audio data contains data of a wake-on-voice word. The first duration ends at a time point at which the first set of audio data is triggered to be recognized, and the second duration starts from the time point at which the first set of audio data is triggered to be recognized.

In some embodiments, the second duration is less than a duration in which the first audio data is recognized.

In some embodiments, the first duration starts from a time point at which the earphone is worn in an ear.

In some embodiments, the processor performs the recognizing the first set of audio data in response to a human-mouth movement occurring.

In some embodiments, the earphone further includes a proximity sensor configured for detecting whether the earphone is worn in an ear and sending a first trigger signal to trigger the processor to send a control instruction to the first microphone, the control instruction indicating the first microphone receives the first audio data; and a human vibration sensor configured for detecting whether the human-mouth movement occurs and sending a second trigger signal to trigger the processor to recognize whether the first set of audio data contains data of the wake-on-voice word.

In some embodiments, the earphone further includes a second microphone configured for receiving a second set of audio data coming from ambient noise; and a second buffer electrically connected to the second microphone and configured for buffering the second set of audio data.

In some embodiments, the second microphone and the second buffer are electrically connected to the processor, respectively, wherein the second set of audio data is received by the second microphone at same time as that the first set of audio data is received by the first microphone, and the first set of audio data is denoised according to the second set of audio data.

Embodiments of the present disclosure provide a method for voice recognition via an earphone, which can avoid a problem of easily-losing words when the voice recognition for wake-words is performed in the earphone. It can be understood that there takes time in a process from detecting a mouth movement by a sensor in the earphone to picking-up a sound by a microphone. Thus, some words will be lost during the voice recognition for wake-words, which results in unreliable recognition. Therefore, embodiments of the present disclosure provide a method for voice recognition via an earphone. Audio data picked-up by a microphone is buffered when the microphone of the earphone is performing the picking-up, and is combined with audio data picked-up after a mouth movement is detected by a sensor, which ensures the completeness of wake-words and avoids word-loss during the voice recognition for wake-word.

A method for voice recognition via an earphone is provided according to some embodiments of the present disclosure. The method is implemented by a processor. The processor may be a processor of the earphone or a processor of an electronic device. The electronic device may be a mobile phone, a tablet computer, MP3, MP4 etc. As shown in FIG. 1, the method includes actions/operations in the following.

At S101, the method receives a first set of audio data via a first microphone.

The earphone can receive voice data when being powered on regardless of being worn into the ear or not. The earphone without being turned off may be inadvertently put at anywhere by some users, so that the earphone is always in a working state. At this time, what the earphone most receives is noise, and a waste of power is also caused. Especially when the wake-on-voice function of the earphone is in a normally open state, the received noise makes the wake-on-voice function always operates and does useless work. Meanwhile, the electronic device or the processor associated with the earphone is also drove to be in a meaningless working state, which wastes power.

It can be understood that the wake-on-voice function of the earphone in embodiments of the present disclosure is set to be in a normally closed state, and is turned on when the wake-on-voice function meets certain conditions, so as to avoid wasting power when the wake-on-voice function is in the normally open state and improve endurance of the earphone.

The earphone receives first set of audio data through the first microphone in embodiments of the present disclosure. That is, the first microphone receives the first set of audio data and output the first set of audio data. It should be noted that the terms "first" and "second" in the embodiments of the present disclosure are only used for description purposes, and cannot be understood as indicating or implying relative importance or implicitly indicating the number of indicated technical features. Thus, features defined as "first", "second", etc. may explicitly or implicitly include at least one features. The earphone is worn into the ear to make clearer for the first microphone to receive the user's first set of audio data. The first set of audio data may include everyday language, phrases or short sentences containing specific vocabularies, numbers, tunes, etc.

At S102, the method recognizes whether the first set of audio data contains data of a wake-on-voice word.

The processor receives the first set of audio data output from the first microphone, and recognizes whether the first set of audio data contains data of the wake-on-voice word. The wake-on-voice word is used to wake up a command-word recognition function. The word usually is a certain vocabulary containing 4-6 words, with avoiding everyday language. For example, the wake-on-voice word can include "Hello, OPPO", "Hello, mobile phone" etc.

The processor receives the first set of audio data output from the first microphone, and recognizes whether the first set of audio data contains data of a wake-on-voice word for waking up the command-word recognition function. The wake-on-voice word may be phrases or short sentences, numbers, or tunes preset by the user, and may also be an associated wake-on-voice word selected from the processor.

The first set of audio data includes first audio data received and buffered in a first duration and second audio data received in a second duration. The first audio data received by the first microphone in the first duration is buffered when the first microphone starts to receive first set of audio data, and the first audio data is combined with the second audio data received by the first microphone in the second duration. Then, word-loss doesn't occur when the processor performs voice recognition.

The starting point of the first duration may be a time point when the earphone is put into the ear to indicate that the first microphone is about to start receiving the first audio data, and the first duration may be ended at a time point when a signal of a mouth movement is detected. There takes a certain duration from sounding from the mouth movement to the detection of the signal of the mouth movement, and the first audio data within this certain duration is received and buffered through the first microphone, and the phenomenon of word-loss will not occur.

The starting point of the second duration may be the time point when the signal of the mouth movement is received to indicate that the mouth has made a sound and the processor is triggered to perform recognition by the signal of the mouth movement, and the second duration may be ended at a time point when the processor starts to recognize first set of audio data. Further, the second duration is less than a duration in which the first audio data is recognized. The second audio data is received within the second duration from triggering recognition by the signal of the mouth movement to starting recognition, and the first audio data received and buffered in the first duration and the second audio data received in the second duration are combined to be recognized. This ensures the completeness of wake-word and avoids word-loss during the voice recognition for wake-words.

Understandably, after the method recognizes whether the first set of audio data contains data of the wake-on-voice word, the method includes that the earphone sends a control instruction to the mobile terminal if the first set of audio data contains data of the wake-on-voice word. The processor recognizes whether the first set of audio data contains data of the wake-on-voice word, to determine whether to send a corresponding control instruction to the mobile terminal.

In this embodiment of the present disclosure, the first set of audio data is received through the first microphone, and then whether the first set of audio data contains data of the wake-on-voice word is determined, so as to determine whether to send a control instruction to the mobile terminal. Further, the first set of audio data includes first audio data received and buffered in the first duration and second audio data received in the second duration, and the first audio data received and buffered in the first duration and the second audio data received within the second duration are combined to be recognized, which ensures that word-loss doesn't occur during voice recognition for wake-word.

Figure 2:
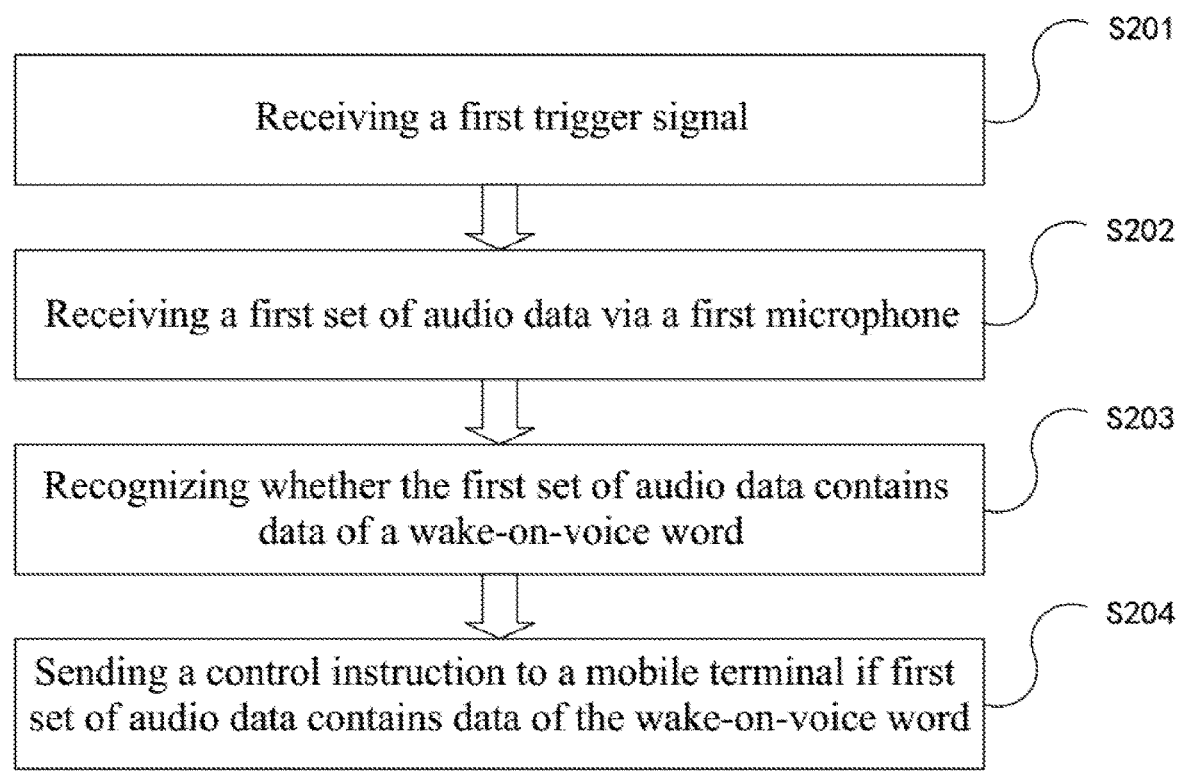
FIG. 2 is a flow chart of a method for voice recognition via an earphone according to some embodiments of the present disclosure.

In some embodiments of the present disclosure, before receiving the first set of audio data, the method further includes receiving a first trigger signal. As shown in FIG. 2, the method in this embodiment includes actions/operations in the following blocks.

At S201, the method receives a first trigger signal. The first trigger signal is used to trigger to receive and buffer the first audio data. The first trigger signal is a signal indicating that the earphone is worn in an ear.

When the earphone is worn in the ear, a detection component in the earphone will output a signal, i.e. the first trigger signal. The signal indicates that the earphone is worn in the ear and used for triggering receiving and buffering of the first audio data. The detection component may be a component that can detect that the earphone is worn in the ear and output the signal, for example a proximity sensor or a touch screen.

When the earphone or the processor receives the first trigger signal indicating that the earphone has been worn in the ear, the first microphone can be triggered to receive and buffer the first audio data. That is, action/operation at block S202 can be performed.

At S202, the method receives first set of audio data via the first microphone. This block is the same as the block S101 in the foregoing embodiment.

At S203, the method recognizes whether the first set of audio data contains data of the wake-on-voice word. This block is the same as the block S102 in the foregoing embodiment.

At S204, the earphone sends a control instruction to a mobile terminal if the first set of audio data contains data of the wake-on-voice word. Whether the first set of audio data contains data of the wake-on-voice word is recognized to determine whether to send a corresponding control instruction to the mobile terminal.

In this embodiment of the present disclosure, the first trigger signal is received to trigger to receive and buffer the first audio data, and then the first audio data received and buffered in the first duration and the second audio data received in the second duration are combined to be recognized, which ensures that word-loss doesn't occur during voice recognition for wake-word.

Figure 3:
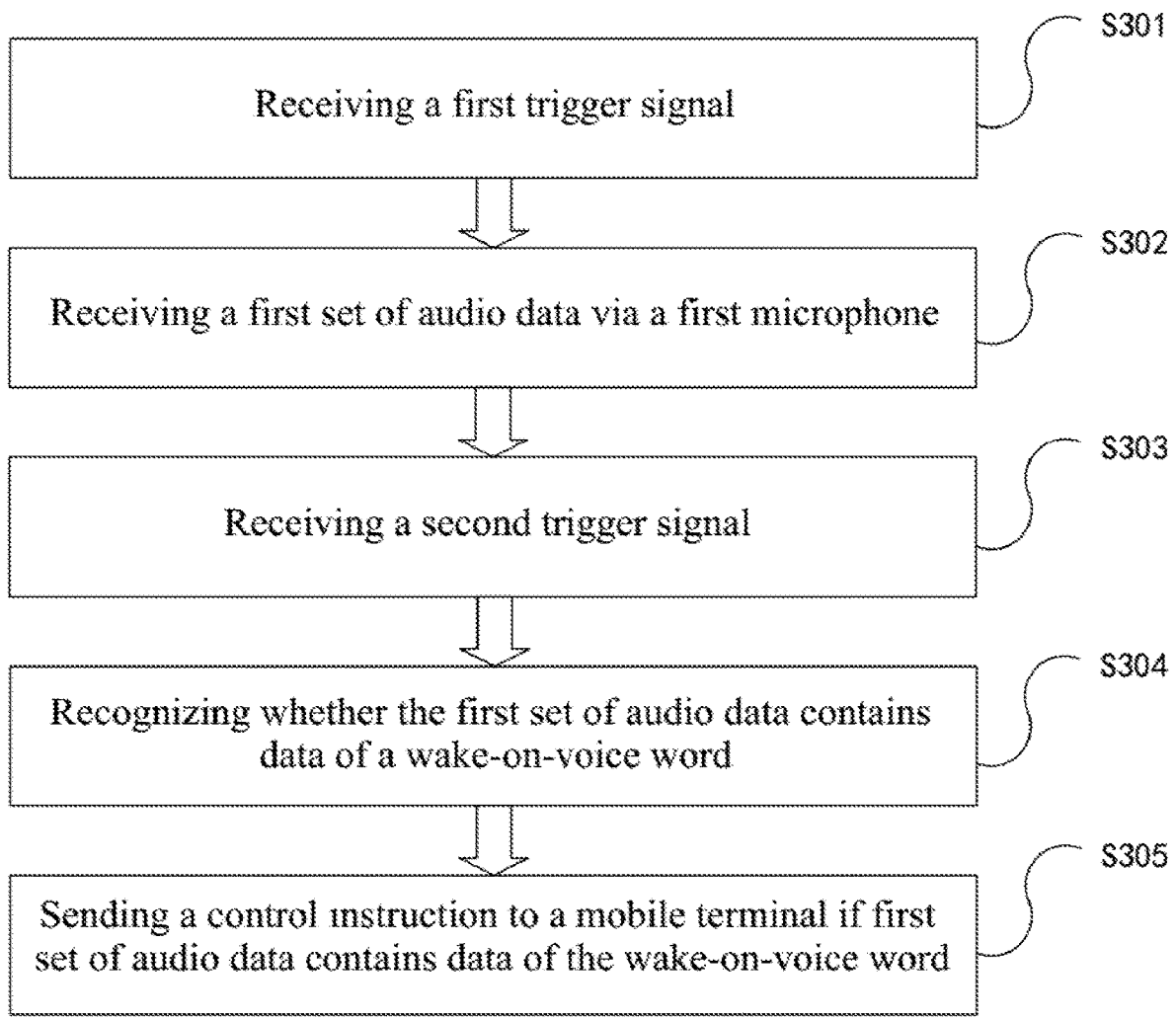
FIG. 3 is a flow chart of a method for voice recognition via an earphone according to some embodiments of the present disclosure.

In some embodiments of the present disclosure, before recognizing whether the first set of audio data contains data of the wake-on-voice word, the method further includes: receiving a second trigger signal. As shown in FIG. 3, the method in this embodiment includes actions/operations in the following blocks.

At S301, the method receives a first trigger signal. This block is the same as the block S201 in the foregoing embodiments.

At S302, the method receives a first set of audio data via the first microphone. This block is the same as the block S202 in the foregoing embodiments.

At S303, the method receives a second trigger signal. The second trigger signal is used to trigger to recognize the first set of audio data. The second trigger signal is a signal indicating a human body movement.

When a mouth movement starts to make sound, a sensor in the earphone will output a signal, i.e. the second trigger signal. The second trigger signal indicates that the mouth has a vocal action to trigger the earphone or the processor of the electronic device to start to recognize the first set of audio data.

Understandably, the sensor may be a G-sensor (Gravity sensor, which is an acceleration sensor), VPU (which is a voice sensor), which can be used to detect the mouth movement and output a signal. Audio data is sent from the mouth, and the earphone in the ear will have a certain movement when there is a mouth movement. At this time, the sensor installed in the earphone will react to detect whether the audio data is caused by a human body movement, and then feedback a detection result to the processor.

When the earphone or the processor receives the second trigger signal indicating the human body movement, the processor can be triggered to start recognizing first set of audio data. That is, block S304 can be performed.

At S304, the method recognizes whether the first set of audio data contains data of the wake-on-voice word. This block is the same as the block S203 in the foregoing embodiments.

At S305, the earphone sends a control instruction to a mobile terminal if the first set of audio data contains data of the wake-on-voice word. This block is the same as the block S204 in the foregoing embodiments.

After the first set of audio data is received through the first microphone, human body movement detection is performed to obtain a trigger signal to trigger the processor to recognize. This process requires a certain time, and also causes a difference between the first set of audio data received via the first microphone and audio data recognized by the processor as be triggered by the trigger signal. That is, some words are lost, resulting in unreliable recognition.

In this embodiment of the present disclosure, after the first set of audio data is received, the first audio data received in the first duration is buffered, and then the trigger signal for the human body movement detection is used to trigger the recognition of the second audio data received in the second duration. The first audio data and the second audio data are combined to be recognized, which ensures that word-loss doesn't occur during voice recognition for wake-word.

Further, the first audio data is buffered to ensure that no words are lost, but it is also impossible to buffer all the audio data received by the first microphone, which will cause a waste of storage space. Therefore, the first microphone starts to receive audio data after receiving the first trigger signal. The first trigger signal indicates that the earphone is worn in the ear. That is, the received first trigger signal indicates that the user wears the earphone in the ear and then audio signal that is required will be received. This can avoid the waste of storage space resulted from receiving excessive audio signals.

Figure 4:
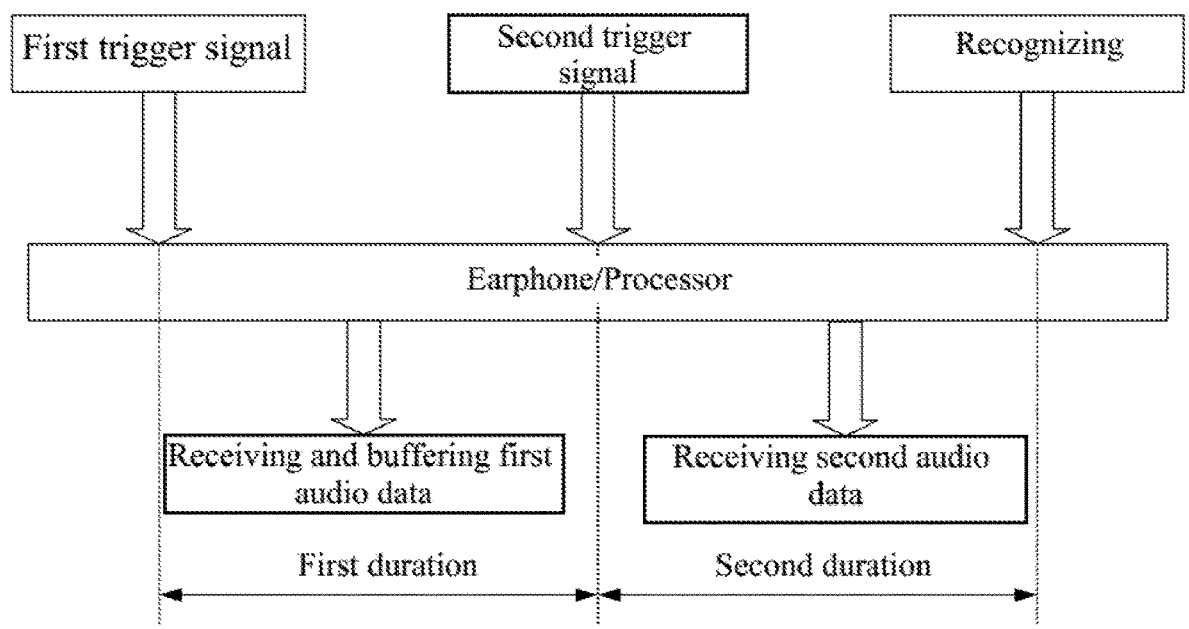
FIG. 4 is a timing diagram of a method for voice recognition via an earphone according to some embodiments of the present disclosure.

In some embodiments of the present disclosure, as shown in FIG. 4, the first duration starts from a time point at which the first trigger signal is received and ends at a time point when the second trigger signal is received, and the second duration starts from the time point when the second trigger signal is received and ends at a time point when whether the first set of audio data contains data of the wake-on-voice word is recognized. It can be understood that the first trigger signal is a signal indicating that the earphone is worn in the ear, and the second trigger signal is a signal indicating a human body movement.

The first trigger signal indicates that the earphone is worn in the ear and is used for triggering to receive and buffer the first audio data. When receiving the first trigger signal indicating that the earphone has been worn in the ear, the earphone or the processor can trigger to receive the first audio data via the first microphone and buffer. When the mouth movement starts to make sound, a sensor in the earphone will output a signal, i.e. the second trigger signal. The second trigger signal indicates that the mouth has a vocal action to trigger the earphone or the processor of the electronic device to start to recognize first set of audio data. When receiving the second trigger signal indicating the human body movement, the earphone or the processor can trigger to start to recognize the first set of audio data. During the process from receiving the second trigger signal to starting to recognize the first set of audio data, the first microphone receives the second audio data.

Figure 5:
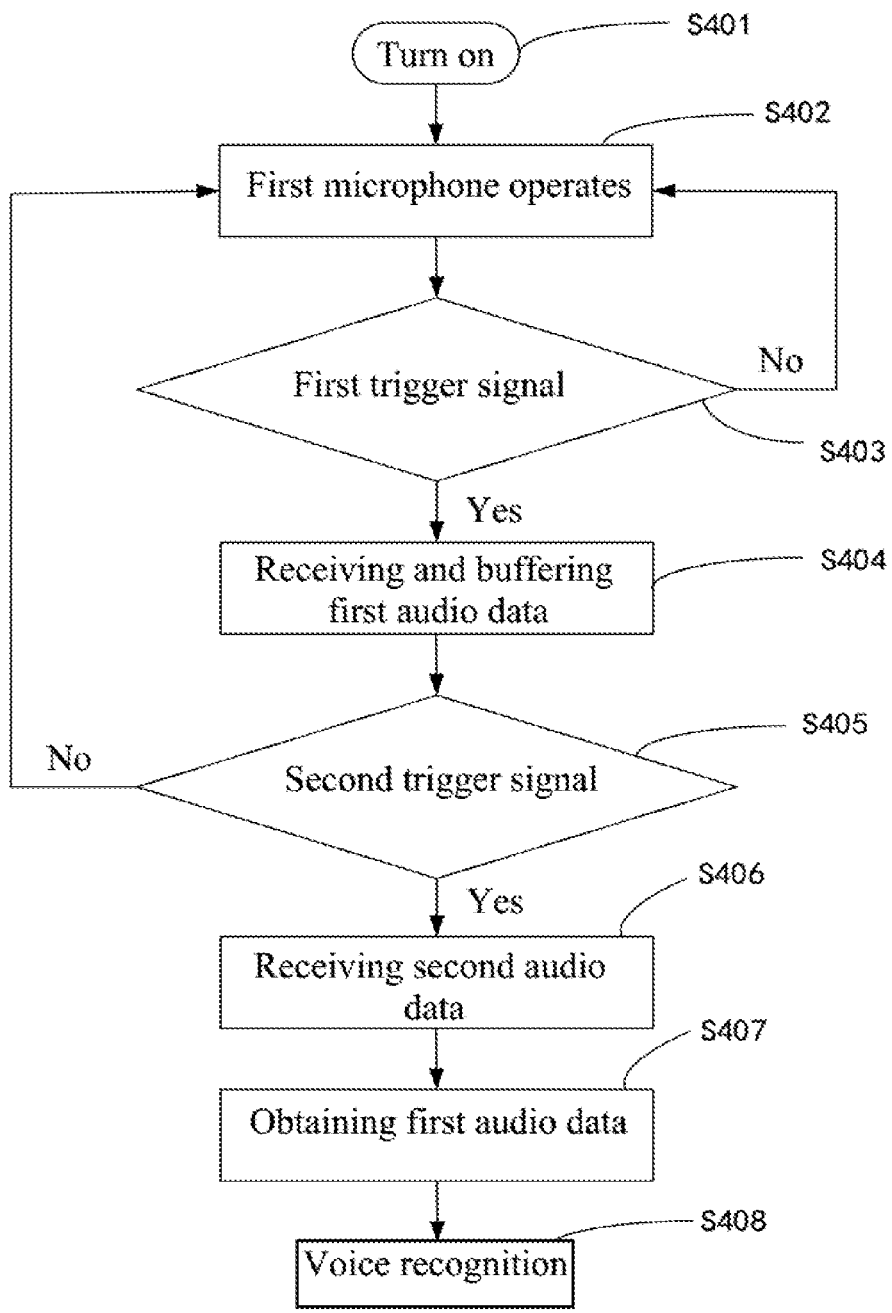
FIG. 5 is a flow chart of a method for voice recognition via an earphone according to some embodiments of the present disclosure.

As shown in FIG. 5 together, which illustrates a flow chart of a method for voice recognition via an earphone according to some embodiments of the present disclosure, the flow chart includes the following actions/operations.

At S401, turn on, such that the earphone is connected to a power supply.

At S402, the first microphone operates. The first microphone can receive audio data. It should be noted that the audio data received by the first microphone at this time is not necessarily the audio data required by the user.

At S403, whether there is a first trigger signal. The first trigger signal is a signal indicating that the earphone is worn in the ear. When there is no first trigger signal, that is, the first microphone does not receive any first trigger signal, it indicates that the earphone is not worn in the ear, and then return to block S402. When the first microphone receives one first trigger signal, it indicates that the earphone is worn in the ear, and then enters block S404.

At S404, the first audio data is received and buffered. Buffering of the first audio data is to ensure that no words are lost, and to avoid wasting storage space resulted from receiving excessive audio signals. The first microphone starts receiving audio data only after receiving the first trigger signal. The first trigger signal indicates a signal that the earphone is worn in the ear, that is, the received first trigger signal indicates that the user has worn the earphone in the ear and then desired audio signal will be received.

At S405, whether there is a second trigger signal. The second trigger signal is a signal indicating a human body movement and is used to trigger to recognize audio data. When there is no second trigger signal, it indicates that the audio data is not caused by a mouth movement, and then return to block S402. When the second trigger signal is received, it indicates that the audio data is caused by the mouth movement, and then enter block S406.

At S406, second audio data is received. When the second trigger signal is received, which indicates a human body movement, the processor can be triggered to start recognizing first set of audio data. During the process from receiving the second trigger signal to starting to recognize the first set of audio data, the first microphone receives the second audio data.

At S407, the first audio data is obtained, and the buffered first audio data is combined with the second audio data, so that the first set of audio data to be recognized by the processor is complete.

At S408, voice recognition is started to recognize audio data obtained by combining the first audio data with the second audio data.

In this embodiment of the present disclosure, the first trigger signal and the second trigger signal are used as time points for receiving the first audio data and the second audio data, and starting the voice recognition. Then the first audio data and the second audio data are combined to be recognized, which avoids word-loss during the voice recognition and ensures the completeness of voice recognition.

Figure 6:
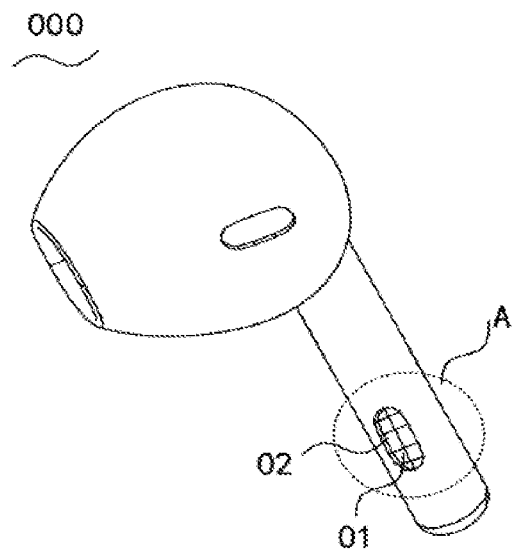
FIG. 6 is a schematic structural view of an earphone for method for voice recognition according to some embodiments of the present disclosure.

In some embodiments of the present disclosure, as shown in FIG. 6, the first microphone receives a first set of audio data, and the first microphone 01 is set in the earphone 000. It can be understood that the first microphone 01 may be disposed on an outer surface of the earphone 000, or may be disposed on an inner surface of the earphone 000. Alternatively, the first microphone 01 is disposed on the inner surface of the earphone 000. Obviously, the earphone 000 has a picking-up opening 02, and the first microphone 01 is disposed on a part of the inner surface of the earphone 000 corresponding to the pickup opening 02, so that the first microphone 01 can pick up sound.

Figure 7:
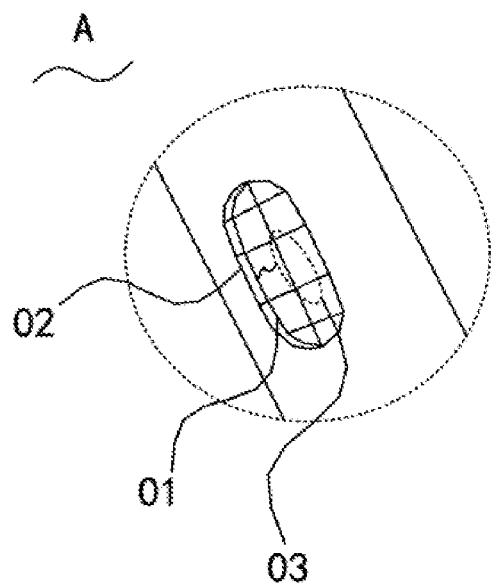
FIG. 7 is an enlarged explanatory diagram of the portion 'A' in FIG. 6.

The earphone 000 has a first buffer 03. As shown in FIG. 7, the first buffer 03 is connected to the first microphone 01, and the first buffer 03 is used for buffering the first audio data received by the first microphone 01 within a first duration. It can be understood that the first buffer 03 can also be disposed on the outer surface or the inner surface of the earphone 000. Alternatively, in this embodiment of the present disclosure, the first buffer 03 is disposed on the inner surface of the earphone 000 to facilitate to be connected to the first microphone 01. Thus, the earphone 000 has a simple and more beautiful appearance.

Figure 8:
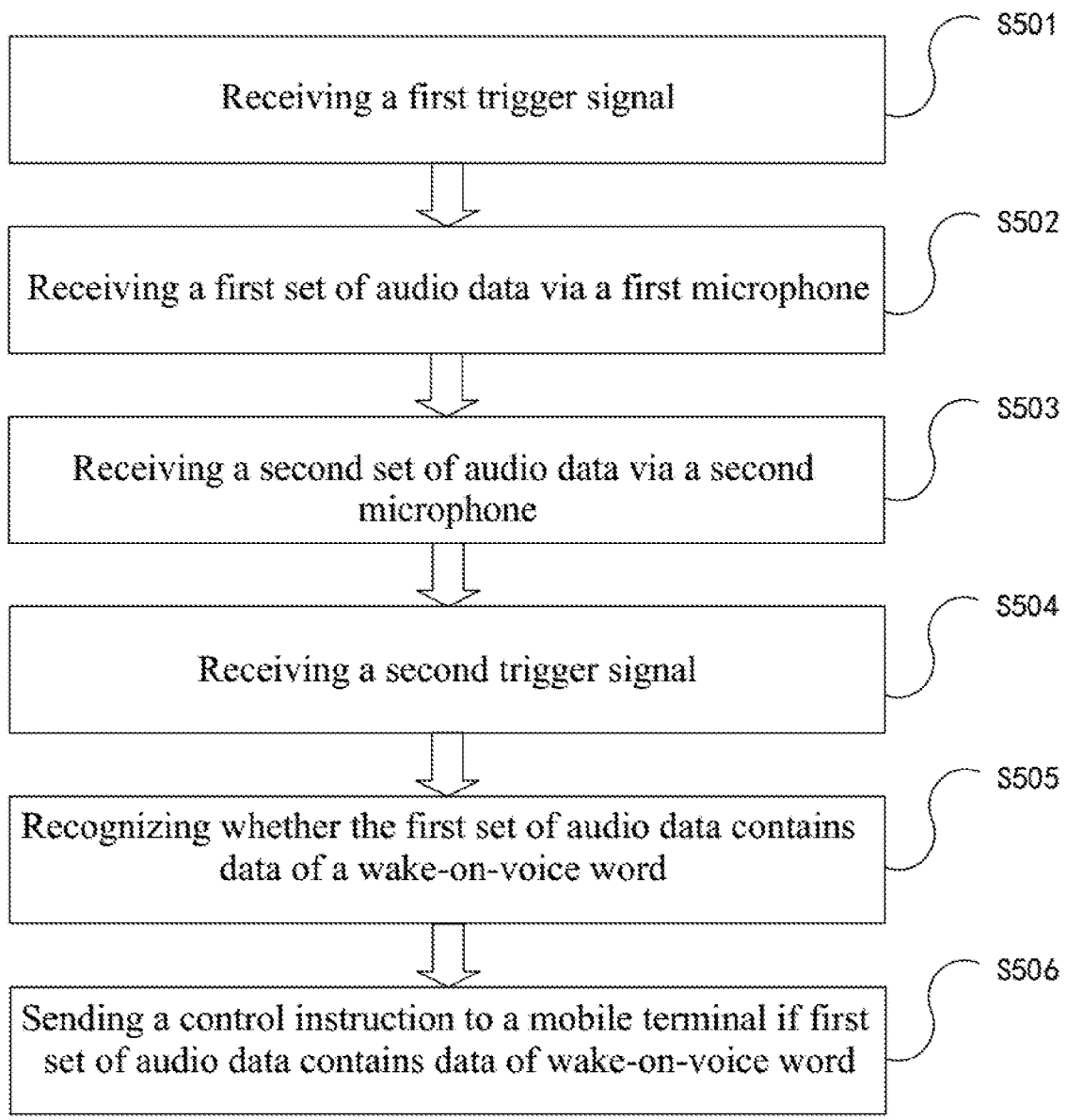
FIG. 8 is a flow chart of a method for voice recognition via an earphone according to some embodiments of the present disclosure.

In some embodiments of the present disclosure, the method further includes receiving a second set of audio data through a second microphone and buffering the second set of audio data to denoise the first set of audio data. Specifically, as shown in FIG. 8, the method in this embodiment includes actions/operations in the following blocks.

At S501, the method receives a first trigger signal. This block is the same as the block S301 in the foregoing embodiments.

At S502, the method receives first set of audio data via the first microphone. This block is the same as the block S302 in the foregoing embodiments.

At S503, the method receives a second set of audio data via a second microphone. In this block, the method receives the second set of audio data via the second microphone and buffers the second set of audio data, so as to denoise the first set of audio data according to the second set of audio data.

The second set of audio data is received through the second microphone, and the first set of audio data is denoised according to the second set of audio data. It is understandable that audio signal received by a microphone include sound signal from the human mouth and noise from the surrounding environment during the communication of the earphone. In order to reduce the impact of ambient noise on the sound signal, two microphones are set. Polarities of access circuits for the two microphones are opposite. One microphone collects positive signals and the other microphone collects negative signals. Further, the two microphones are set at different positions, wherein one microphone is closer to the human mouth, and the other microphone is farther from the human mouth.

Further, distances that the ambient noise reaches the two microphones are almost same, and the impact of the ambient noise can be reduced in the case where the two microphones collect opposite signals. Further, the first set of audio data received by the first microphone includes the sound signal from the human mouth and the ambient noise, and the second set of audio data received by the second microphone comes from the ambient noise. It is understandable that the first microphone receives first set of audio data at the same time as the second microphone receives the second set of audio data. That is, the first set of audio data and second set of audio data are received at the same time.

As the second set of audio data and the first set of audio data are received at the same time, when the first audio data in the first set of audio data is buffered, a part of the audio data in the second set of audio data which is synchronized with the first audio data also needs to be buffered synchronously. In this way, there will no data loss during a process where the first set of audio data is denoised according to the second set of audio data.

At S504, the method receives a second trigger signal. This block is the same as block S303 in the foregoing embodiments.

At S505, the method recognizes whether the first set of audio data contains data of the wake-on-voice word. This block is the same as the block S304 in the foregoing embodiments.

At S506, the earphone sends a control instruction to the mobile terminal if the first set of audio data contains data of the wake-on-voice word. This block is the same as the block S305 in the foregoing embodiments.

In this embodiment of the present disclosure, the second microphone is set to reduce the noise in the first set of audio data, so as to make the sound quality clearer and reduce the risk of voice recognition errors.

Figure 9:
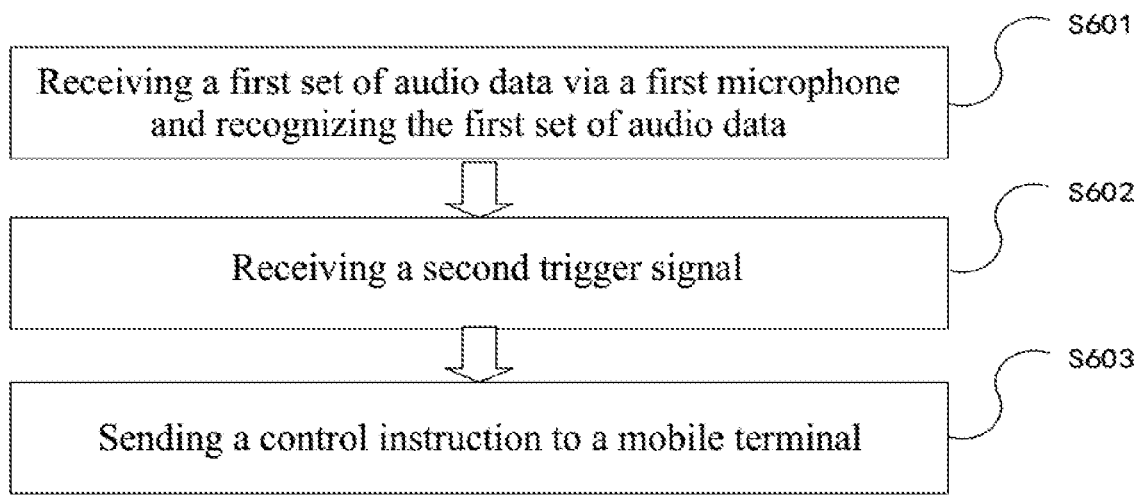
FIG. 9 is a flow chart of a method for voice recognition via an earphone according to some embodiments of the present disclosure.

In some embodiments of the present disclosure, a method for voice recognition via an earphone is provided according to some embodiments of the present disclosure. The method is implemented by a processor. The processor may be a processor of the earphone or a processor of an electronic device. The electronic device may be a mobile phone, a tablet computer, MP3, MP4 etc. As shown in FIG. 9, the method includes actions/operations in the following.

At S601, the method receives first set of audio data via a first microphone and recognizes the first set of audio data.

It can be understood that the first microphone recognizes first set of audio data through a digital signal processor therein, or a processor of an electronic device associated with the first microphone. That is, a processor that can recognize first set of audio data will recognize the first set of audio data.

Specifically, the first microphone receives the first set of audio data and recognizes whether the first set of audio data contains data of a wake-on-voice word for waking up the command-word recognition function. If the first set of audio data contains data of the wake-on-voice word, then action/operation at block S602 is performed. The wake-on-voice word may be phrases or short sentences, numbers, or tunes preset by the user, and may also be an associated wake-on-voice word selected from a processor.

At S602, the method receives a second trigger signal. The second trigger signal is a signal indicating a human body movement.

When a mouth movement starts to make sound, a sensor in the earphone will output a signal, i.e. the second trigger signal. The second trigger signal indicates the mouth movement to indicate that audio data is from a human.

Understandably, the sensor may be a G-sensor (Gravity sensor, which is an acceleration sensor), VPU (which is a voice sensor), which can be used to detect the mouth movement and output a signal. Audio data is sent from the mouth, and the earphone in the ear will have a certain movement when there is a mouth movement. At this time, the sensor installed in the earphone will react to detect whether the audio data is caused by a human body movement, and then feedback a detection result to the processor.

When the second trigger signal indicating the human body movement is received, enters to block 603.

At S603, the method sends a control instruction to a mobile terminal.

In this embodiment of the present disclosure, the first microphone receives the first set of audio data and recognizes whether the first set of audio data contains data of the wake-on-voice word. That is, the first set of audio data is recognized when it is received, and the phenomenon of word-loss does not occur. At the same time, whether a second trigger signal is received indicates whether the first set of audio data is sent from a human mouth, and then whether to send a control instruction to the mobile terminal is determined. Thus, the response speed is fast, and the recognition efficiency is high.

Figure 10:
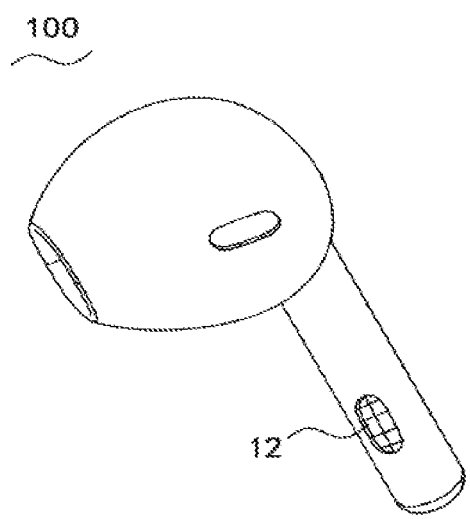
FIG. 10 is a schematic structural view of an earphone according to some embodiments of the present disclosure.
Figure 11:
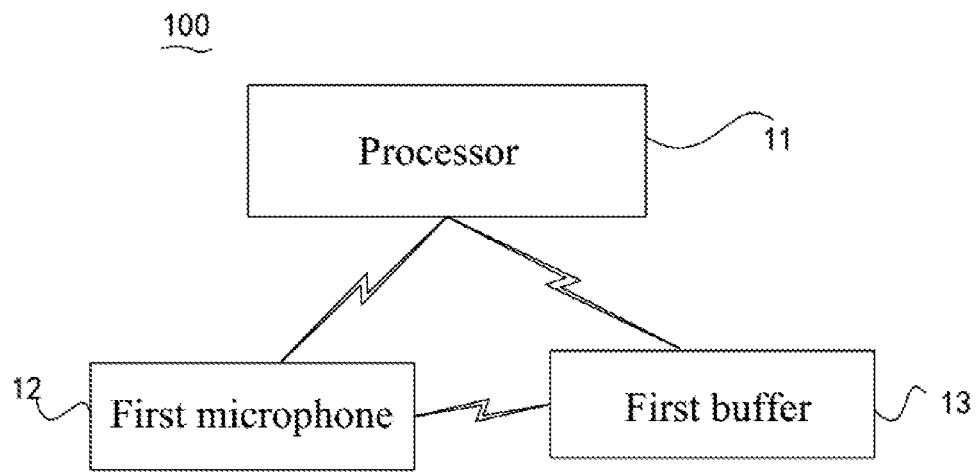
FIG. 11 is a schematic structural view of an earphone according to some embodiments of the present disclosure.

In some embodiments of the present disclosure, an earphone 100 is also provided. As shown in FIG. 10 and FIG. 11 together, the earphone 100 includes a processor 11, a first microphone 12, and a first buffer 13. The first microphone 12 and the first buffer 13 are electrically connected to the processor 11, respectively. The first microphone 12 is used to receive a first set of audio data, the first buffer 13 is used to buffer first set of audio data, and the processor 11 is used to recognize whether the first set of audio data contains data of a wake-on-voice word and send a control instruction to the first microphone 12 such that the first microphone 12 receives the first set of audio data.

In order to avoid the phenomenon of word-loss when the processor 11 recognizes the first set of audio data, the first microphone 12 outputs the received first set of audio data to the first buffer 13 for storage. Then the processor 11 obtains the first set of audio data and recognizes to determine whether the first set of audio data contains data of a wake-on-voice word.

The first set of audio data includes first audio data received by the first microphone 12 and buffered in a first duration and second audio data received in a second duration. The first audio data received by the first microphone 12 in the first duration is buffered in the first buffer 13 when the first microphone 12 starts to receive first set of audio data, and the first audio data is combined with the second audio data received by the first microphone 12 in the second duration and output to the processor 11. Then, word-loss doesn't occur when the processor 11 performs voice recognition.

The starting point of the first duration may be a time point when the earphone is put into the ear to indicate that the first microphone 12 is about to start receiving the first audio data, and the first duration may be ended at a time point when a signal of a mouth movement is detected. There takes a certain duration from sounding from the mouth movement to the detection of the signal of the mouth movement, and the first audio data within this certain duration is received through the first microphone 12 and buffered in the first buffer 13, and the phenomenon of word-loss will not occur.

The starting point of the second duration may be the time point when the signal of the mouth movement is received to indicate that the mouth has made a sound and the processor 11 is triggered to perform recognition by the signal of the mouth movement, and the second duration may be ended at a time point when the processor 11 starts to recognize first set of audio data. The second audio data is received within the second duration from triggering recognition by the signal of the mouth movement to starting recognition, and the first audio data received and buffered in the first duration and the second audio data received in the second duration are combined to be recognized. This ensures the completeness of wake-word and avoids word-loss during the voice recognition for wake-words.

In this embodiment of the present disclosure, the first set of audio data is received through the first microphone 12, the buffer 13 stores corresponding audio signal, and then whether the first set of audio data contains data of the wake-on-voice word is determined by the processor 11, so as to determine whether to send a control instruction to the mobile terminal. Further, the first set of audio data includes first audio data received in the first duration and buffered in the first buffer 13 and second audio data received by the first microphone 12 in the second duration, and the first audio data received and buffered in the first duration and the second audio data received within the second duration are combined and output to the processor 11 to be recognized, which ensures that word-loss doesn't occur during voice recognition for wake-word.

Figure 12:
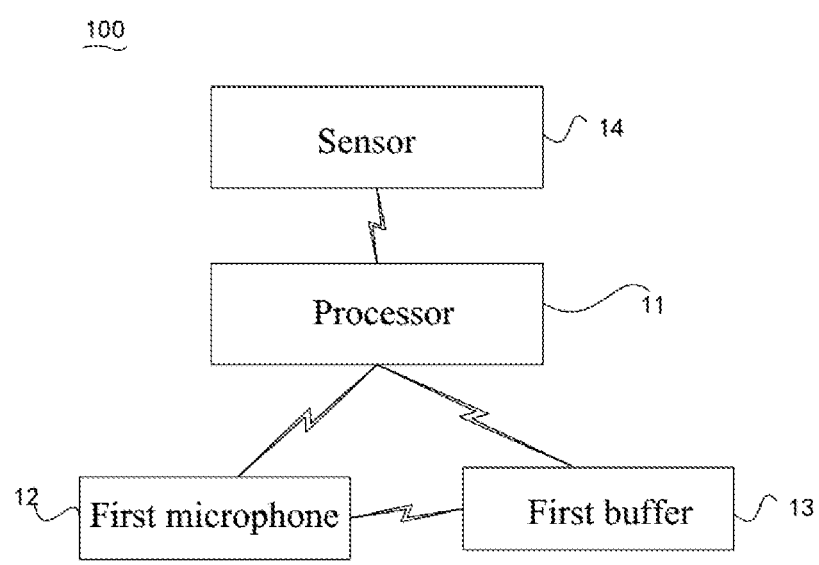
FIG. 12 is a schematic structural view of an earphone according to some embodiments of the present disclosure.
Figure 13:
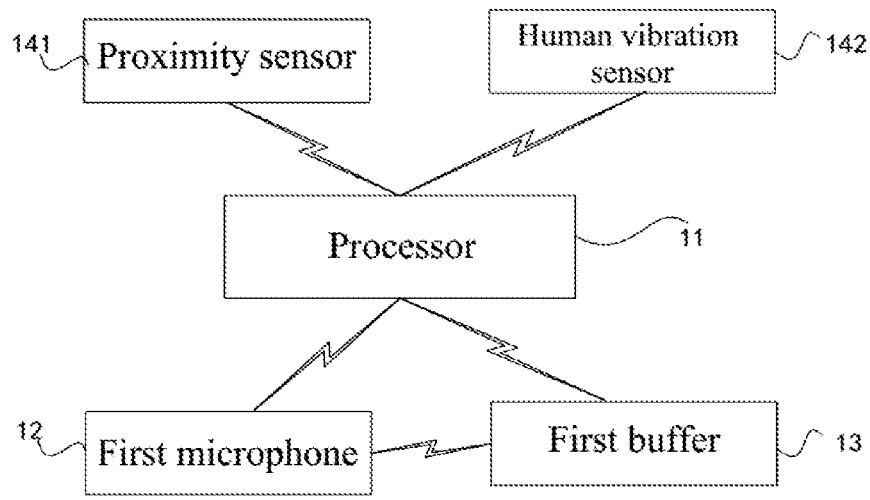
FIG. 13 is a schematic structural view of an earphone according to some embodiments of the present disclosure.

In some embodiments of the present disclosure, the earphone 100 further includes a sensor. As shown in FIG. 12, the earphone 100 includes a sensor 14. The sensor 14 is electrically connected to the processor 11 to send a trigger signal to the processor 11 so that the processor 11 executes a corresponding operation. Further, as shown in FIG. 13 together, the sensor 14 includes a proximity sensor 141 and a human vibration sensor 142. The proximity sensor 141 is used to send a first trigger signal to trigger the processor 11 to send a control instruction to the first microphone 12 such that the first microphone 12 receives the first set of audio data. The human vibration sensor 142 is used to send a second trigger signal to trigger the processor 11 to recognize whether the first set of audio data contains data of a wake-on-voice word.

The proximity sensor 141 is a device having a capability of sensing the proximity of an object, and outputting a corresponding signal, which can detect a movement and presence information of the object and convert it into an electrical signal. There are many types of proximity sensors, mainly including a capacitive proximity sensor, an inductive proximity sensor, and a photoelectric proximity sensor. The embodiments of the present disclosure adopt the capacitive proximity sensor alternatively.

The human vibration sensor 142 is a sensor for sensing human vibration, for example, a bone conduction sensor. A bone conduction sensor is a device that senses the vibration of a bone and converts the vibration into an electrical signal, an optical signal, or other signals. In embodiments of the present disclosure, an existing bone conduction sensor may be selected, for example, a 13×2 sensor of Sonion. In embodiments of the present disclosure, the human vibration sensor 142 may also be other sensors, such as an acceleration sensor attached to the human skin, which can sense the vibration of the skin, or a bioelectric sensor connected to the human body, which can sense the bioelectrical changes of the human body and then detect the bioelectrical changes resulted from human vibration.

Further, the proximity sensor 141 sends a first trigger signal, and the human vibration sensor 142 sends a second trigger signal. The first trigger signal is a signal indicating that the earphone is worn in the ear, and the second trigger signal is a signal indicating a human body movement. The first trigger signal indicates that the earphone is worn in the ear for triggering to receive and buffer the first audio data, and the second trigger signal indicates that the mouth has a vocal action to trigger the earphone or a processor of an electronic device to start recognizing the first set of audio data. It can be understood that the first trigger signal is sent earlier than the second trigger signal.

Furthermore, the first audio data is received and buffered in the first duration, and the second audio data is received in the second duration. The first duration begins from a time point at which the first trigger signal is sent and ends at another time point at which the second trigger signal is sent. The second duration begins from the time point at which the second trigger signal is sent and ends at a time point at which the processor 11 recognizes whether the first set of audio data contains data of the wake-on-voice word.

Specifically, when the earphone has been worn in the ear, the proximity sensor 141 will send a signal, i.e. the first trigger signal, which can trigger the first microphone 12 to receive the first audio data and buffer the first audio data into the first buffer 13. When the mouth has a vocal action, the human vibration sensor 142 will send a signal, i.e. the second trigger signal, which can trigger the processor 11 to start recognizing the first set of audio data.

In this embodiment of the present disclosure, the proximity sensor 141 sends the first trigger signal and the human vibration sensor 142 sends the second trigger signal, so as to receive and buffer the first audio data in the first duration and receive the second audio data in the second duration. Thus, the first audio data and the second audio data are combined and output to the processor 11 for recognition, which ensures the complete recognition and avoids the phenomenon of word-loss.

Figure 14:
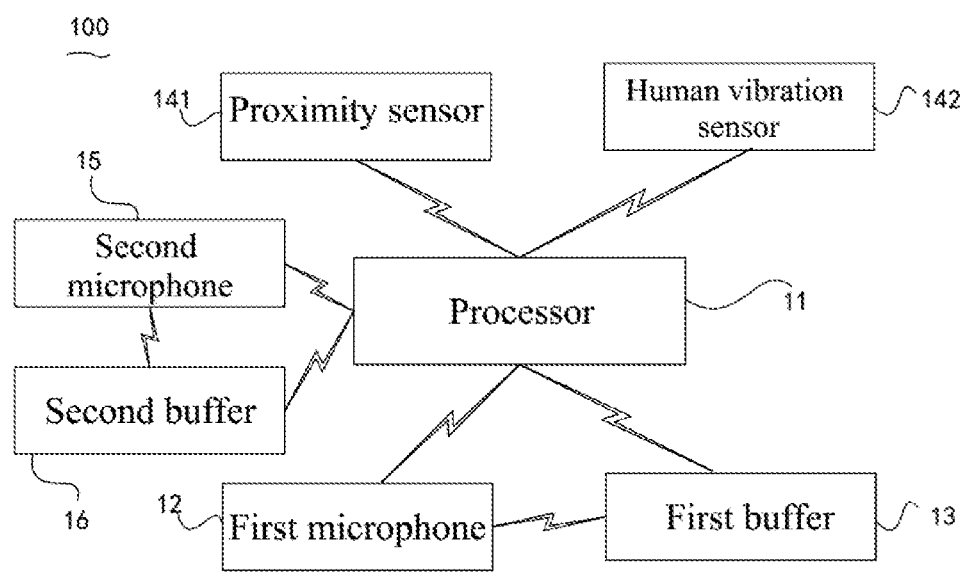
FIG. 14 is a schematic structural view of an earphone according to some embodiments of the present disclosure.

In some embodiments of the present disclosure, as shown in FIG. 14, the earphone 100 further includes a second microphone 15 and a second buffer 16. The second microphone 15 is used to receive audio data, and the second buffer 16 is electrically connected to the second microphone 15 and used to buffer the audio data. Further, the second microphone 15 and the second buffer 16 are electrically connected to the processor 11 respectively, so that the second microphone 15 receives the audio data at the same time as the first microphone 12 receives the first set of audio data, and the first set of audio data is denoised according to the audio data.

Specifically, the second microphone 15 receives the second set of audio data, and the first set of audio data is denoised according to the second set of audio data. It is understandable that audio signals received by a microphone include sound signal from the human mouth and noise from the surrounding environment during the communication of the earphone. In order to reduce the impact of ambient noise, two microphones are set. Distances that the ambient noise reaches the two microphones are almost same, and the impact of the ambient noise can be reduced in the case where the two microphones collect opposite signals.

Further, the first set of audio data received by the first microphone 12 includes the sound signal from the human mouth and the ambient noise, and the second set of audio data received by the second microphone 15 comes from the ambient noise. It is understandable that the first microphone 12 receives first set of audio data at the same time as the second microphone 15 receives second set of audio data. That is, the first set of audio data and second set of audio data are received at the same time.

As the second set of audio data and the first set of audio data are received at the same time, when the first audio data in the first set of audio data is buffered in the first buffer 13, a part of the audio data in the second set of audio data which is synchronized with the first audio data also needs to be buffered synchronously in the second buffer 16. In this way, there will no data loss during a process where the first set of audio data is denoised according to the second set of audio data.

Figure 15:
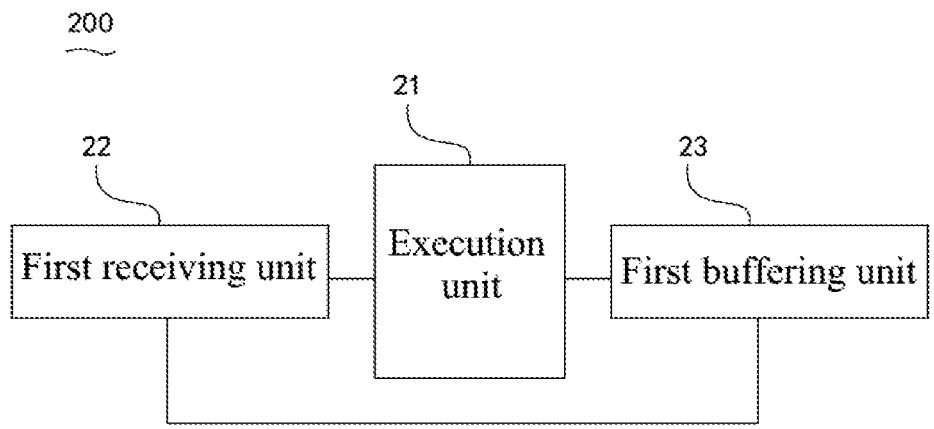
FIG. 15 is a schematic structural view of an apparatus for voice recognition according to some embodiments of the present disclosure.

In some embodiments of the present disclosure, an apparatus 200 for voice recognition is also provided. As shown in FIG. 15, the apparatus 200 for voice recognition includes an execution unit 21, a first receiving unit 22, and a first buffering unit 23. The first receiving unit 22 and the first buffering unit 23 are electrically connected to the execution unit 21, respectively. The first receiving unit 22 is used to receive a first set of audio data, the first buffering unit 23 is used to buffer first set of audio data, and the execution unit 21 is used to recognize whether the first set of audio data contains data of a wake-on-voice word and send a control instruction to the first receiving unit 22 such that the first receiving unit 22 receives the first set of audio data.

In order to avoid the phenomenon of word-loss when the execution unit 21 recognizes a first set of audio data, the first receiving unit 22 outputs the received first set of audio data to the first buffering unit 23 for storage. Then the execution unit 21 obtains the first set of audio data and recognizes to determine whether the first set of audio data contains data of a wake-on-voice word.

The first set of audio data includes first audio data received by the first receiving unit 22 and buffered in a first duration and second audio data received in a second duration. The first audio data received by the first receiving unit 22 in the first duration is buffered in the first buffering unit 23 when the first receiving unit 22 starts to receive first set of audio data, and the first audio data is combined with the second audio data received by the first receiving unit 22 in the second duration and output to the execution unit 21. Then, word-loss doesn't occur when the execution unit 21 performs voice recognition.

The starting point of the first duration may be a time point when the earphone is put into the ear to indicate that the first receiving unit 22 is about to start receiving the first audio data, and the first duration may be ended at a time point when a signal of a mouth movement is detected. There takes a certain duration from sounding from the mouth movement to the detection of the signal of the mouth movement, and the first audio data within this certain duration is received through the first receiving unit 22 and buffered in the first buffering unit 23, and the phenomenon of word-loss will not occur.

The starting point of the second duration may be the time point when the signal of the mouth movement is received to indicate that the mouth has made a sound and the execution unit 21 is triggered to perform recognition by the signal of the mouth movement, and the second duration may be ended at a time point when the execution unit 21 starts to recognize first set of audio data. The second audio data is received within the second duration from triggering recognition by the signal of the mouth movement to starting recognition, and the first audio data received and buffered in the first duration and the second audio data received in the second duration are combined to be recognized. This ensures the completeness of wake-word and avoids word-loss during the voice recognition for wake-words.

In this embodiment of the present disclosure, the first set of audio data is received through the first receiving unit 22, the buffer 13 stores corresponding audio signal, and then whether the first set of audio data contains data of the wake-on-voice word is determined by the execution unit 21, so as to determine whether to send a control instruction to the mobile terminal. Further, the first set of audio data includes first audio data received in the first duration and buffered in the first buffering unit 23 and second audio data received by the first receiving unit 22 in the second duration, and the first audio data received and buffered in the first duration and the second audio data received within the second duration are combined and output to the execution unit 21 to be recognized, which ensures that word-loss doesn't occur during voice recognition for wake-word.

Figure 16:
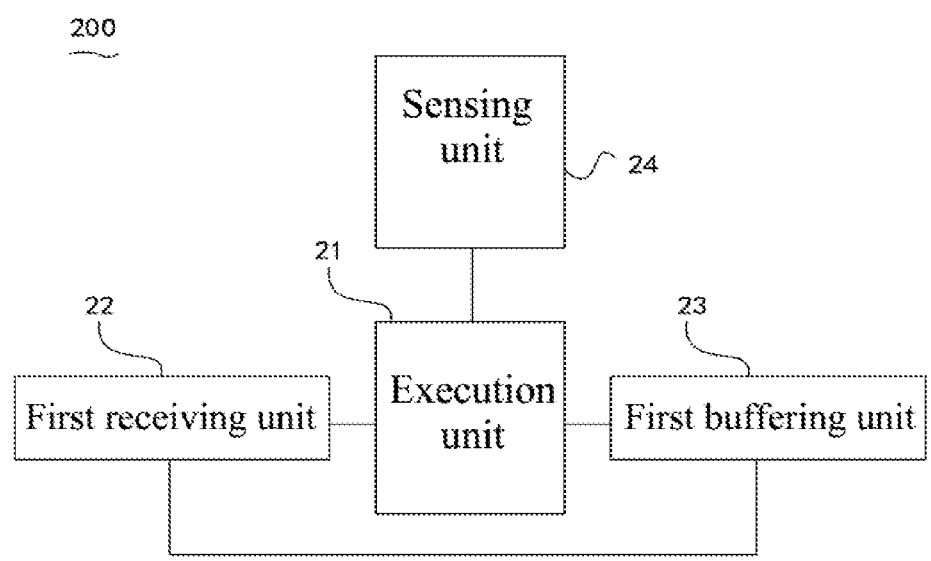
FIG. 16 is a schematic structural view of an apparatus for voice recognition according to some embodiments of the present disclosure.
Figure 17:
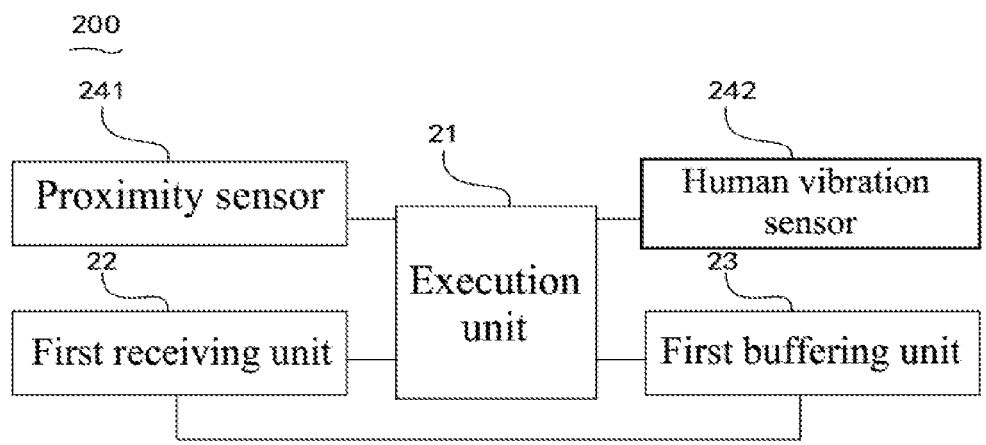
FIG. 17 is a schematic structural view of an apparatus for voice recognition according to some embodiments of the present disclosure.

In some embodiments of the present disclosure, the apparatus 200 for voice recognition further includes a sensing unit. As shown in FIG. 16, the apparatus 200 for voice recognition includes a sensing unit 24. The sensing unit 24 is electrically connected to the execution unit 21 to send a trigger signal to the execution unit 21 so that the execution unit 21 executes a corresponding operation. Further, as shown in FIG. 17 together, the sensing unit 24 includes a proximity sensor 241 and a human vibration sensor 242. The proximity sensor 241 is used to send a first trigger signal to trigger the execution unit 21 to send a control instruction to the first receiving unit 22 such that the first receiving unit 22 receives the first set of audio data. The human vibration sensor 242 is used to send a second trigger signal to trigger the execution unit 21 to recognize whether the first set of audio data contains data of a wake-on-voice word.

It should be noted that the sensing unit 24 and the execution unit 21 may be an independent sensor or processor, or may be integrated in a processor. In addition, they may also be stored in a memory in the form of program codes, which are called by the processor to perform a function of each unit. The processor here may be a central processing unit (CPU) or an application specific integrated circuit (ASIC), or be configured to be one or more integrated circuits implementing the embodiments of the present disclosure.

The proximity sensor 241 is a device having a capability of sensing the proximity of an object, and outputting a corresponding signal, which can detect a movement and presence information of the object and convert it into an electrical signal. There are many types of proximity sensors, mainly including a capacitive proximity sensor, an inductive proximity sensor, and a photoelectric proximity sensor. The embodiments of the present disclosure adopt the capacitive proximity sensor alternatively.

The human vibration sensor 242 is a sensor for sensing human vibration, for example, a bone conduction sensor. A bone conduction sensor is a device that senses the vibration of a bone and converts the vibration into an electrical signal, an optical signal, or other signals. In embodiments of the present disclosure, an existing bone conduction sensor may be selected, for example, a 13×2 sensor of Sonion. In embodiments of the present disclosure, the human vibration sensor 242 may also be other sensors, such as an acceleration sensor attached to the human skin, which can sense the vibration of the skin, or a bioelectric sensor connected to the human body, which can sense the bioelectrical changes of the human body and then detect the bioelectrical changes resulted from human vibration.

Further, the proximity sensor 241 sends a first trigger signal, and the human vibration sensor 242 sends a second trigger signal. The first trigger signal is a signal indicating that the earphone is worn in the ear, and the second trigger signal is a signal indicating a human body movement. The first trigger signal indicates that the earphone is worn in the ear for triggering to receive and buffer the first audio data, and the second trigger signal indicates that the mouth has a vocal action to trigger the earphone or a processor of an electronic device to start recognizing the first set of audio data. It can be understood that the first trigger signal is sent earlier than the second trigger signal.

Furthermore, the first audio data is received and buffered in the first duration, and the second audio data is received in the second duration. The first duration begins from a time point at which the first trigger signal is sent and ends at another time point at which the second trigger signal is sent. The second duration begins from the time point at which the second trigger signal is sent and ends at a time point at which the execution unit 21 recognizes whether the first set of audio data contains data of the wake-on-voice word.

Specifically, when the earphone has been worn in the ear, the proximity sensor 241 will send a signal, i.e. the first trigger signal, which can trigger the first receiving unit 22 to receive the first audio data and buffer the first audio data into the first buffering unit 23. When the mouth has a vocal action, the human vibration sensor 242 will send a signal, i.e. the second trigger signal, which can trigger the execution unit 21 to start recognizing the first set of audio data.

In this embodiment of the present disclosure, the proximity sensor 241 sends the first trigger signal and the human vibration sensor 242 sends the second trigger signal, so as to receive and buffer the first audio data in the first duration and receive the second audio data in the second duration. Thus, the first audio data and the second audio data are combined and output to the execution unit 21 for recognition, which ensures the complete recognition and avoids the phenomenon of word-loss.

Figure 18:
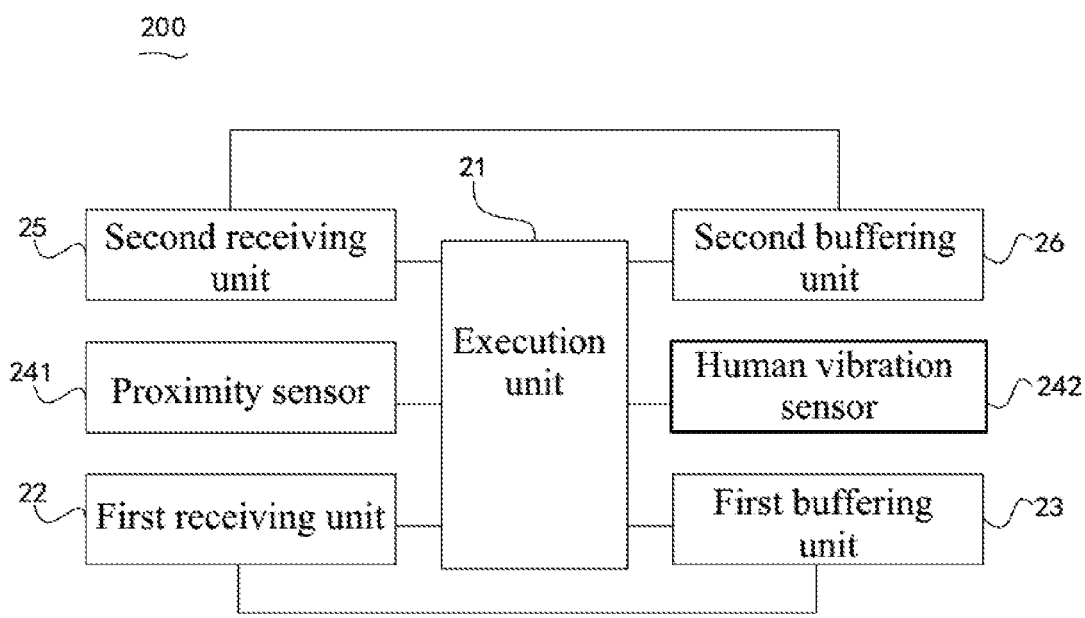
FIG. 18 is a schematic structural view of an apparatus for voice recognition according to some embodiments of the present disclosure.

In some embodiments of the present disclosure, as shown in FIG. 18, the apparatus 200 for voice recognition further includes a second receiving unit 25 and a second buffering unit 16. The second receiving unit 25 is used to receive audio data, and the second buffering unit 16 is electrically connected to the second receiving unit 25 and used to buffer the audio data. Further, the second receiving unit 25 and the second buffering unit 16 are electrically connected to the execution unit 21 respectively, so that the second receiving unit 25 receives the audio data at the same time as the first receiving unit 22 receives the first set of audio data, and the first set of audio data is denoised according to the audio data.

Specifically, the second receiving unit 25 receives the second set of audio data, and the first set of audio data is denoised according to the second set of audio data. It is understandable that audio signals received by a microphone include sound signal from the human mouth and noise from the surrounding environment during the communication of the earphone. In order to reduce the impact of ambient noise, two microphones are set. Distances that the ambient noise reaches the two microphones are almost same, and the impact of the ambient noise can be reduced in the case where the two microphones collect opposite signals.

Further, the first set of audio data received by the first receiving unit 22 includes the sound signal from the human mouth and the ambient noise, and the second set of audio data received by the second receiving unit 25 comes from the ambient noise. It is understandable that the first receiving unit 22 receives first set of audio data at the same time as the second receiving unit 25 receives second set of audio data. That is, the first set of audio data and second set of audio data are received at the same time.

As the second set of audio data and the first set of audio data are received at the same time, when the first audio data in the first set of audio data is buffered in the first buffering unit 23, a part of the audio data in the second set of audio data which is synchronized with the first audio data also needs to be buffered synchronously in the second buffering unit 26. In this way, there will no data loss during a process where the first set of audio data is denoised according to the second set of audio data.

The above is only a part of the embodiments of the present disclosure and does not limit the scope of protection of the present disclosure. Any equivalent device or equivalent process transformation made according to the description and drawings of this present disclosure, or directly or indirectly use in other related technical field, shall fall in the scope of patent protection of this present disclosure similarly.

What is claimed is:

1. A method for voice recognition via an earphone comprising a first microphone, the method comprising:
    receiving a first trigger signal, wherein the first trigger signal is a signal indicating that the earphone is worn in an ear;
    receiving first audio data via the first microphone and buffering the first audio data in response to the first trigger signal;
    receiving a second trigger signal, wherein the second trigger signal is a signal indicating that a human-mouth movement occurs;
    receiving second audio data via the first microphone and recognizing whether the first audio data contains data of a wake-on-voice word in response to the second trigger signal; and
    recognizing whether the second audio data contains data of the wake-on-voice word;
    wherein the first audio data is received and buffered in a first duration, the first duration starting from a time point at which the first trigger signal is received and ending at another time point at which the second trigger signal is received; and
    wherein the second audio data is received in a second duration, the second duration starting from the another time point at which the second trigger signal is received and ending at yet another time point at which whether the first audio data contains data of the wake-on-voice word is recognized.

2. The method as claimed in claim 1, wherein the second duration is less than a duration in which the first audio data is recognized.

3. The method as claimed in claim 1, further comprising:
    sending a control instruction to a mobile terminal connected to the earphone in response to the wake-on-voice word being recognized from the first audio data or the second audio data, the control instruction indicating the mobile terminal to perform an operation corresponding to the wake-on-voice word.

4. The method as claimed in claim 1, wherein the earphone further comprises a first buffer connected to the first microphone and configured for buffering the first audio data received in the first duration.

5. The method as claimed in claim 1, comprising:
receiving a second set of audio data via a second microphone and buffering the second set of audio data in a second buffer, the second set of audio data coming from ambient noise and comprising third audio data and fourth audio data, wherein the third audio data and the first audio data are received and buffered simultaneously in the first duration, and the fourth audio data and the second audio data are received simultaneously in the second duration; and
denoising the first audio data according to the third audio data and denoising the second audio data according to the fourth audio data.

6. A method for voice recognition via an earphone comprising a first microphone, the method comprising:
recognizing whether a first set of audio data contains data of a wake-on-voice word, the first set of audio data comprising first audio data and second audio data, the first audio data being received and buffered via the first microphone in a first duration, and the second audio data being received via the first microphone in a second duration; wherein the first duration ends at a time point at which the recognizing is performed, and the second duration starts from time point at which the time point at which the recognizing is performed;
receiving a second set of audio data via a second microphone and buffering the second set of audio data in a second buffer, the second set of audio data coming from ambient noise, wherein the first set of audio data and the second set of audio data are received simultaneously; and
denoising the first set of audio data according to the second set of audio data.

7. The method as claimed in claim 6, wherein the second duration is less than a duration in which whether the first audio data is recognized.

8. The method as claimed in claim 7, wherein the first duration starts from a time point at which the earphone is worn in an ear.

9. The method as claimed in claim 8, wherein the recognizing is performed in response to a human-mouth movement occurring.

10. The method as claimed in claim 6, further comprising:
sending a control instruction to a mobile terminal connected to the earphone in response to the wake-on-voice word being recognized from the first audio data or the second audio data, the control instruction indicating the mobile terminal to perform an operation corresponding to the wake-on-voice word.

11. An earphone, comprising:
a first microphone configured for receiving a first set of audio data comprising first audio data and second audio data, wherein the first audio data is received in a first duration, and the second audio data is received in a second duration;
a first buffer electrically connected to the first microphone and configured for buffering the first set of audio data, wherein the first audio data is buffered in the first duration;
a processor electrically connected to the first microphone and the first buffer, respectively, and configured for recognizing whether the first set of audio data contains data of a wake-on-voice word, wherein the first duration ends at a time point at which the first set of audio data is triggered to be recognized, and the second duration starts from the time point at which the first set of audio data is triggered to be recognized;
a proximity sensor configured for detecting whether the earphone is worn in an ear and sending a first trigger signal to trigger the processor to send a control instruction to the first microphone, the control instruction indicating the first microphone receives the first audio data; and
a human vibration sensor configured for detecting whether the human-mouth movement occurs and sending a second trigger signal to trigger the processor to recognize whether the first set of audio data contains data of the wake-on-voice word.

12. The earphone as claimed in claim 11, wherein the second duration is less than a duration in which the first audio data is recognized.

13. The earphone as claimed in claim 12, wherein the first duration starts from a time point at which the earphone is worn in an ear.

14. The earphone as claimed in claim 13, wherein the processor performs the recognizing the first set of audio data in response to a human-mouth movement occurring.

15. The earphone as claimed in claim 11, further comprising:
a second microphone configured for receiving a second set of audio data coming from ambient noise; and
a second buffer electrically connected to the second microphone and configured for buffering the second set of audio data.

16. The earphone as claimed in claim 15, wherein the second microphone and the second buffer are electrically connected to the processor, respectively, wherein the second set of audio data is received by the second microphone at same time as that the first set of audio data is received by the first microphone, and the first set of audio data is denoised according to the second set of audio data.

* * * * *